US011195249B2

(12) United States Patent
Uchida et al.

(10) Patent No.: US 11,195,249 B2
(45) Date of Patent: Dec. 7, 2021

(54) PROCESSING DEVICE HAVING A ROW NUMBER DETERMINING UNIT

(71) Applicant: Hitachi Automotive Systems, Ltd., Hitachinaka (JP)

(72) Inventors: Yusuke Uchida, Tokyo (JP); Hiroki Mizosoe, Yokohama (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 53 days.

(21) Appl. No.: 16/620,095

(22) PCT Filed: Apr. 23, 2018

(86) PCT No.: PCT/JP2018/016504
§ 371 (c)(1),
(2) Date: Dec. 6, 2019

(87) PCT Pub. No.: WO2019/003610
PCT Pub. Date: Jan. 3, 2019

(65) Prior Publication Data
US 2021/0150662 A1 May 20, 2021

(30) Foreign Application Priority Data
Jun. 27, 2017 (JP) .............................. JP2017-125597

(51) Int. Cl.
*G06T 1/20* (2006.01)
*G06T 1/60* (2006.01)
*G06F 12/0815* (2016.01)

(52) U.S. Cl.
CPC ............ *G06T 1/60* (2013.01); *G06F 12/0815* (2013.01); *G06T 1/20* (2013.01)

(58) Field of Classification Search
CPC .......... G06F 12/0815; G06T 1/20; G06T 1/60
(Continued)

(56) References Cited

U.S. PATENT DOCUMENTS

| 2010/0054272 A1* | 3/2010 | Iwamoto ............... H04L 45/741 370/428 |
| 2010/0321538 A1 | 12/2010 | Nakazono et al. |

(Continued)

FOREIGN PATENT DOCUMENTS

| JP | 2001-101396 A | 4/2001 |
| JP | 2010-28758 A | 2/2010 |

(Continued)

OTHER PUBLICATIONS

International Search Report (PCT/ISA/210) issued in PCT Application No. PCT/JP2018/016504 dated May 29, 2018 with English translation (five pages).

(Continued)

*Primary Examiner* — Jacinta M Crawford
(74) *Attorney, Agent, or Firm* — Crowell & Moring LLP

(57) ABSTRACT

A processing device includes a low-speed storage unit that stores an image extending in a column direction and a row direction, a high-speed storage unit on which reading is executed at a higher speed than the low-speed storage unit and which stores a region corresponding to the entire image in the column direction and a predetermined storage row that is a portion in the row direction of the image, a reading unit that continuously reads the image in the column direction from the high-speed storage unit, and a determining unit that reads the image from the low-speed storage unit and writes the image to the high-speed storage unit. The determining unit determines a row number to be read next in the image based on the minimum or maximum row number in the row direction of the image, stored in the high-speed storage unit for each of targets that are to be processed and are obtained by dividing the column direction into predetermined pixels.

6 Claims, 9 Drawing Sheets

(58) Field of Classification Search
USPC .................................................. 345/537, 557
See application file for complete search history.

(56) References Cited

U.S. PATENT DOCUMENTS

| 2011/0122298 A1 | 5/2011 | Takahashi et al. |
| 2012/0044387 A1 | 2/2012 | Usami |
| 2013/0235235 A1 | 9/2013 | Takahashi |

FOREIGN PATENT DOCUMENTS

| JP | 2011-2940 A | 1/2011 |
| JP | 2011-113234 A | 6/2011 |
| JP | 2012-44530 A | 3/2012 |
| JP | 2013-186705 A | 9/2013 |
| JP | 2016-218612 A | 12/2016 |

OTHER PUBLICATIONS

Japanese-language Written Opinion (PCT/ISA/237) issued in PCT Application No. PCT/JP2018/016504 dated May 29, 2018 (three pages).

* cited by examiner

FIG. 3

|  |  |  |  |  |  |  |  |  |  |  |  |
|---|---|---|---|---|---|---|---|---|---|---|---|
| 1080 |  |  |  |  |  |  |  |  |  |  |  |
| 1079 |  |  |  |  |  |  |  |  |  |  |  |
| · |  |  |  |  |  |  |  |  |  |  |  |
| · |  |  |  |  |  |  |  |  |  |  |  |
| 8 |  |  |  |  |  |  |  |  |  |  |  |
| 7 |  |  |  |  |  |  |  |  |  |  |  |
| 6 |  |  |  |  |  |  |  |  |  |  |  |
| 5 |  |  |  |  |  |  |  |  |  |  |  |
| 4 |  |  |  |  |  |  |  |  |  |  |  |
| 3 |  |  |  |  |  |  |  |  |  |  |  |
| 2 |  |  |  |  |  |  |  |  |  |  |  |
| 1 |  |  |  |  |  |  |  |  |  |  |  |
|  | 1 | 2 | 3 | · | · | 10 | 11 | · | · | 1919 | 1920 |
|  | w1 | | | | | w2 | | | | w192 | |

13

Y (ROWS)

X (COLUMNS)

| | c1 | c2 | c3 | c4 | c5 | c6 | . . . | c192 |
|---|---|---|---|---|---|---|---|---|
| MAXIMUM Y COORDINATES STORED | 120 | 120 | 120 | 122 | 122 | 122 | . . . | 150 |

MANAGEMENT TABLE 144

FIG. 7A

|     | c1 | c2 | c3 | c4 | c5 | c6 | c7 | c8 | c9 | c10 | c11 | c12 | .. |
|-----|----|----|----|----|----|----|----|----|----|-----|-----|-----|----|
| r8  |    |    |    |    |    |    |    |    |    | 4   | 4   | 4   |    |
| r7  |    |    |    |    |    |    | 3  | 3  | 3  | 3   | 3   | 4   |    |
| r6  |    |    |    |    |    |    | 3  | 3  | 3  | 3   | 3   |     |    |
| r5  |    |    |    | 2  | 2  | 2  | 2  | 2  | 3  | 3   | 3   |     |    |
| r4  |    |    |    | 2  | 2  | 2  | 2  | 2  |    |     |     |     |    |
| r3  | 1  | 1  | 1  | 1  | 1  | 2  | 2  | 2  |    |     |     |     |    |
| r2  | 1  | 1  | 1  | 1  | 1  |    |    |    |    |     |     |     |    |
| r1  | 1  | 1  | 1  | 1  | 1  |    |    |    |    | 4   | 4   | 4   |    |

|     | c1 | c2 | c3 | c4 | c5 | c6 | c7 | c8 | c9 | c10 | c11 | c12 | .. |
|-----|----|----|----|----|----|----|----|----|----|-----|-----|-----|----|
| r8  |    |    |    |    |    |    | 36 | 36 | 36 | 4   | 4   | 4   |    |
| r7  |    |    |    | 35 | 35 | 35 | 3  | 3  | 3  | 3   | 3   | 4   |    |
| r6  |    |    |    | 35 | 35 | 35 | 3  | 3  | 3  | 3   | 3   |     |    |
| r5  | 34 | 34 | 34 | 2  | 2  | 2  | 2  | 2  | 3  | 3   | 3   |     |    |
| r4  | 34 | 34 | 34 | 2  | 2  | 2  | 2  | 2  |    |     |     |     |    |
| r3  | 1  | 1  | 1  | 1  | 1  | 2  | 2  | 2  |    | 37  | 37  | 37  |    |
| r2  | 1  | 1  | 1  | 1  | 1  |    |    |    |    | 37  | 37  | 37  |    |
| r1  | 1  | 1  | 1  | 1  | 1  | 36 | 36 | 36 | 4  | 4   | 4   |     |    |

|                     | c1 | c2 | c3 | c4 | c5 | c6 | c7 | c8 | c9 | c10 | c11 | c12 |
|---------------------|----|----|----|----|----|----|----|----|----|-----|-----|-----|
| INITIAL             | 0  | 0  | 0  | 0  | 0  | 0  | 0  | 0  | 0  | 0   | 0   | 0   |
| AFTER 4TH PROCESS   | 3  | 3  | 3  | 5  | 5  | 5  | 7  | 7  | 7  | 9   | 9   | 9   |
| AFTER 37TH PROCESS  | 5  | 5  | 5  | 7  | 7  | 7  | 9  | 9  | 9  | 11  | 11  | 11  |

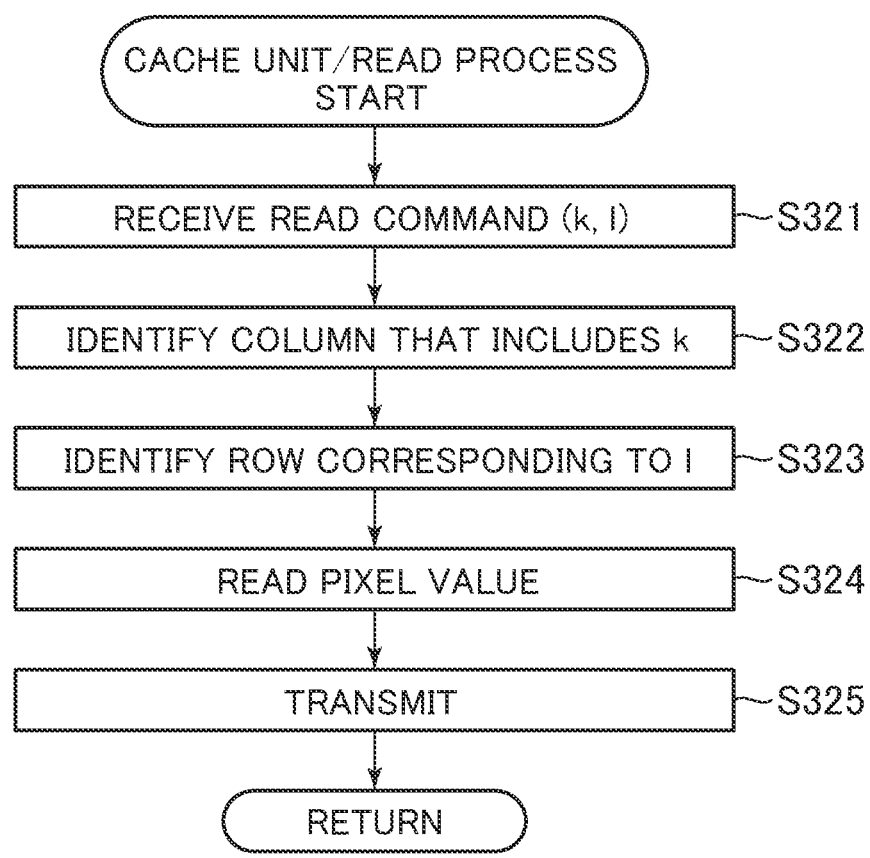

PROCESSING DEVICE HAVING A ROW NUMBER DETERMINING UNIT

TECHNICAL FIELD

The present invention relates to a processing device.

BACKGROUND ART

Since a camera lens has a distortion characteristic, generated image data includes distortion. In addition, depending on camera installation conditions, effects such as enlargement, reduction, rotation, and shearing may occur and the generated image data includes even more differences from the actual image. Furthermore, when a recorded image is reproduced, the reproduced image may include effects such as enlargement, reduction, and shearing depending on installation conditions of a reproducing device. An image processing device, which corrects such differences from the actual image, calculates correspondence relationships between the image before the correction and the image after the correction and reads pixels before the correction or a collection of pixels, which are necessary for pixels of the image after the correction. A storage device for storing image data generally tends to be more costly when an access speed is faster. Thus, to store a large amount of image data per frame at a low cost, a low-speed storage device is selected. However, in an image correction process where the same data is read repeatedly, a low access speed may cause a decrease in a processing speed.

As a resolution method for this problem, a cache mechanism using a high-speed storage device is known. The cache mechanism is a method in which a small amount of image data which makes up a portion of a single frame is read into a high-speed storage device from a low-speed storage device storing a large amount of image data per frame and reading is repeated from the high-speed storage device. Japanese Unexamined Patent Application Publication No. 2016-218612 discloses the following configuration: in the case where input image data of an input tile Q21 is read from a memory 120 and stored in a storage unit 110, image data of a cache region in the storage unit 110 in which input image data of an overlapping region S remains is excluded, and image data of an input image region R21 is obtained from the memory 120 and stored in the storage unit 110.

CITATION LIST

Patent Literature

Patent Literature 1: Japanese Unexamined Patent Application Publication No. 2016-218612

SUMMARY OF INVENTION

Technical Problem

According to the invention described in Japanese Unexamined Patent Application Publication No. 2016-218612, it cannot be easily determined whether or not a portion of image data has already been read.

Solution to Problem

A processing device according to a first aspect of the invention includes a low-speed storage unit that stores an image extending in a column direction and a row direction, a high-speed storage unit on which reading is executed at a higher speed than the low-speed storage unit and which stores a region corresponding to the entire image in the column direction and a predetermined storage row that is a portion in the row direction of the image, a reading unit that continuously reads the image in the column direction from the high-speed storage unit, and a determining unit that reads the image from the low-speed storage unit and writes the image to the high-speed storage unit. The determining unit determines a row number to be read next in the image based on the minimum or maximum row number, stored in the high-speed storage unit, in the row direction of the image for each of targets that are to be processed and are obtained by dividing the column direction into predetermined pixels.

Advantageous Effects of Invention

According to the invention, it can be easily determined whether or not a portion of image data has already been read.

BRIEF DESCRIPTION OF DRAWINGS

FIG. 3 is a schematic diagram depicting a captured image.

FIG. 5 is a schematic diagram depicting a structure of a high-speed storage unit 145.

FIG. 6 is a diagram depicting an example of a management table 144.

FIGS. 7A to 7C are diagrams depicting an example of operations of an image processing device 1, in which FIG. 7A depicts regions that are included in the high-speed storage unit 145 and on which writing is executed first to fourth, FIG. 7B depicts regions that are included in the high-speed storage unit 145 and on which writing is executed thirty fourth to thirty seventh, and FIG. 7C depicts values stored in the management table 144.

FIG. 9 is a flowchart of a reading process of the cache unit 141.

DESCRIPTION OF EMBODIMENTS

Embodiment

Hereinafter, an embodiment of an image processing device is described with reference to FIGS. 1 to 9.

Configuration

Figure 1:
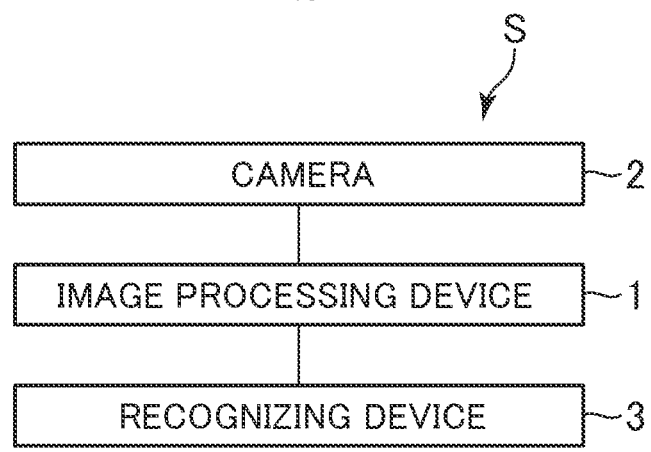
FIG. 1 is a diagram depicting a configuration of an image processing system S.

FIG. 1 is a diagram depicting a configuration of an image processing system S including an image processing device 1. The image processing system S includes the image processing device 1, a camera 2, and a recognizing device 3. The camera 2 outputs an image (hereinafter referred to as "captured image") acquired by imaging to the image processing device 1. The image processing device 1 executes a distortion correction process on the captured image to generate an image (hereinafter referred to as "distortion-corrected image) obtained by correcting distortion and outputs the distortion-corrected image to the recognizing device 3. The recognizing device 3 executes various applications using the distortion-corrected image. The image processing device 1, the camera 2, and the recognizing device 3 may be connected to each other by wires and may transmit and receive information of the image to and from each other or may transmit and receive the information of the image to and from each other via wireless communication. In addition, the image processing device 1, the camera 2, and the recognizing device 3 may be installed in the same location or in different locations or countries. Moreover, the transmission and reception of the information by the image processing device 1, the camera 2, and the recognizing device 3 may be executed via communication in real time, or the information of the image may be read after the information of the image is stored in a portable storage device and the storage device is moved.

Figure 2:
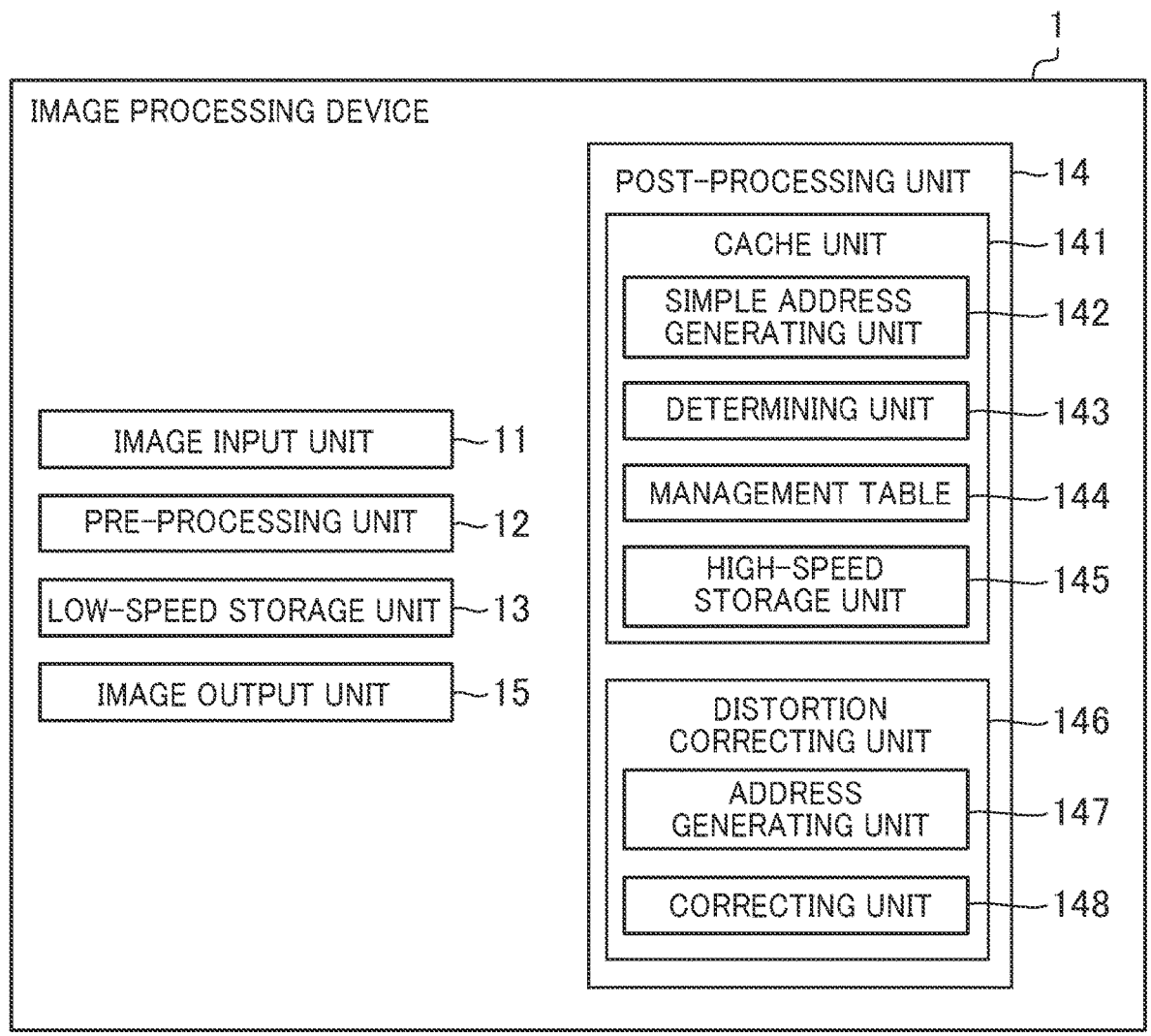
FIG. 2 is a functional block diagram depicting an image processing device 1.

FIG. 2 is a functional block diagram depicting a functional configuration of the image processing device 1. The image processing device 1 includes an image input unit 11, a pre-processing unit 12, a low-speed storage unit 13, a post-processing unit 14, and an image output unit 15. The image input unit 11 and the image output unit 15 are I/O interface circuits. The pre-processing unit 12 and the post-processing unit 14 are, for example, circuits that are configured in a field-programmable gate array (FPGA). The low-speed storage unit 13 is, for example, an SD-RAM, and has a lower access speed or reading and writing speeds than a high-speed storage unit 145 described later. In addition, the low-speed storage unit 13 has, as a hardware feature, a predefined unit of amount of information to be read. For example, in the case where the unit of amount of information to be read is 64 bytes, when 3-byte information is requested to the low-speed storage unit 13, 64-byte information that includes the requested 3-byte information can be obtained from the low-speed storage unit 13.

A captured image is input from the camera 2 to the image input unit 11. The image input unit 11 outputs the input captured image to the pre-processing unit 12. The pre-processing unit 12 executes, on each pixel of the input captured image, a process composed of operations, for example, brightness adjustment, and causes the captured image after the process to be stored in the low-speed storage unit 13. The post-processing unit 14 reads the captured image stored in the low-speed storage unit 13 and executes a distortion correction process to generate a distortion-corrected image. The post-processing unit 14 outputs the generated distortion-corrected image to the image output unit 15. The image output unit 15 outputs the image output from the post-processing unit 14 to the recognizing device 3.

The post-processing unit 14 includes a cache unit 141 and a distortion correcting unit 146. The cache unit 141 provides information of the captured image requested by the distortion correcting unit 146 to the distortion correcting unit 146. The distortion correcting unit 146 reads the captured image and generates the distortion-corrected image. The distortion correcting unit 146 requests the cache unit 141 to provide information of each region of a portion of the captured image and acquires the entire captured image in several batches. The cache unit 141 calculates in advance an approximate region to be requested by the distortion correcting unit 146 and acquires information of the region of the captured image from the low-speed storage unit 13 before the information is requested by the distortion correcting unit 146. When the distortion correcting unit 146 requests the information, the cache unit 141 quickly provides the information of the captured image.

The cache unit 141 includes a simple address generating unit 142, a determining unit 143, a management table 144, and a high-speed storage unit 145. The simple address generating unit 142 executes substantially the same address calculation process as an address generating unit 147 described later, included in the distortion correcting unit 146. By executing this, a region that includes all pixels within the captured image requested by the distortion correcting unit 146, or a read destination address, is calculated. The address calculated by the simple address generating unit 142 is a rough estimate, for example, is in units of 10 pixels, and the calculation load is small. Details are described later.

The determining unit 143 determines, from the region indicated by the read destination address output by the simple address generating unit 142, a region that has not yet been stored in the high-speed storage unit 145. The determining unit 143 acquires information of pixels of the region from the low-speed storage unit 13 and causes the information to be stored in the high-speed storage unit 145. The determining unit 143 refers to the management table 144, determines the region stored in the high-speed storage unit 145, and rewrites the management table 144 as necessary. The operation of the determining unit 143 is described later. The management table 144 is a storage region allocated to the FPGA. The management table 144 stores information indicating the region, stored in the high-speed storage unit 145, of the captured image. The high-speed storage unit 145 is a storage region configured in the FPGA and has a higher access speed than the low-speed storage unit 13. A configuration of the high-speed storage unit 145 is described later.

The distortion correcting unit 146 includes an address generating unit 147 and a correcting unit 148. The address generating unit 147 accurately calculates, for example in units of 1 pixel, an address that indicates a region of the captured image to be processed by the correcting unit 148. The address generating unit 147 transmits the address to the cache unit 141. The cache unit 141 outputs information, corresponding to the received address, of the captured image to the distortion correcting unit 146. The correcting unit 148 uses the information acquired from the cache unit 141 to correct distortion and color information through a known method and generates a distortion-corrected image.

Example of Captured Image and Image Reading

FIG. 3 is a schematic diagram depicting a captured image. The captured image has, for example, a resolution of 1920 pixels in a horizontal direction and 1080 pixels in a vertical direction. In other words, the captured image is 1920×1080 pieces of color information arranged in a grid. In the present embodiment, a pixel on the bottom left of the captured image is treated as a reference position or a pixel with coordinates (1,1), the right side of the figure is treated as a positive direction of an X axis, and the upper side of the figure is treated as a positive direction of a Y axis. Information of consecutive pixels, arranged in the horizontal direction, of the captured image is stored in consecutive regions included in the low-speed storage unit 13. In the present embodiment, information, corresponding to the unit of amount of information to be read from the low-speed storage unit 13, of pixels of the captured image corresponds to 10 pixels. In the following description, the captured image is referred to as w1, w2, w3 . . . , in units of 10 pixels in the horizontal direction. In the present embodiment, since the width of the captured image is 1920 pixels, the right edge is w192.

The distortion correcting unit 146 scans and processes the captured image in the positive direction from the vicinity of the first pixel in the X axis. When the right edge of the captured image is reached, a target to be processed is shifted in the positive direction of the Y axis, and the captured image is scanned from the vicinity of the first pixel in the X axis. In other words, the distortion correcting unit 146 executes a so-called raster scan. In addition, since not only information of the pixels to be processed but also information of the pixels in the vicinity are used in the distortion correction process, the captured image is divided into multiple blocks, each of which is composed of multiple pixels, and 1 block is treated as a unit to be processed. Specifically, the distortion correcting unit 146 uses a predetermined algorithm to calculate an address of a block to be processed by the correcting unit 148, or a region of the captured image.

Figure 4:
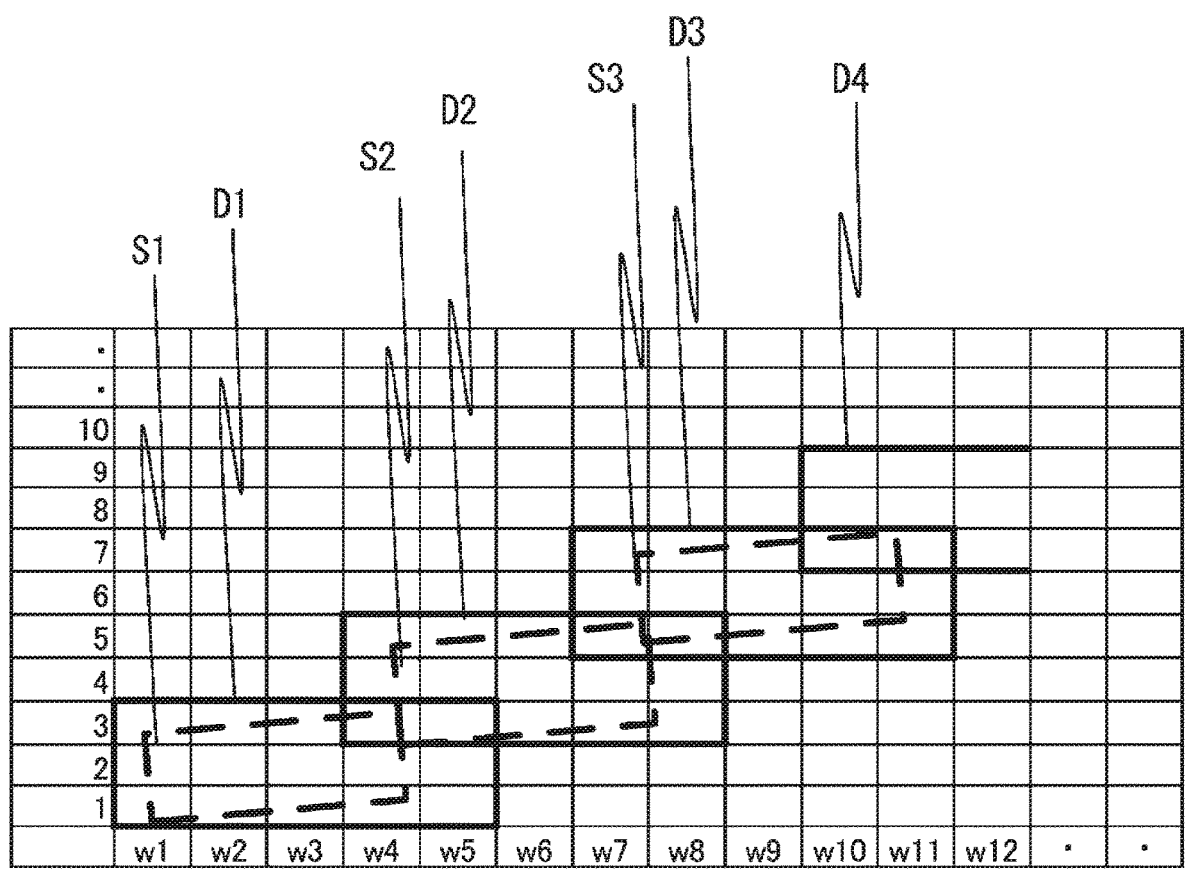
FIG. 4 is a diagram depicting a region of a captured image that is to be read.

FIG. 4 is a diagram depicting a region of the captured image that is to be read. FIG. 4 is different from FIG. 3 in that the unit of information to be read in the horizontal direction is depicted as w1, w2, w3 . . . . In other words, the amount of information to be stored in one grid cell in FIG. 4 is equal to the amount of information stored in 10 grid cells in FIG. 3. In FIG. 4, dashed lines indicate address regions S1 to S3 generated by the address generating unit 147 of the distortion correcting unit 146, and solid lines indicate address regions D1 to D4 generated by the simple address generating unit 142 of the cache unit 141.

An address region that is first generated by the address generating unit 147 is S1, and an address region D1 that is first generated by the simple address generating unit 142 is calculated so that the address region D1 includes the foregoing S1. The address region S1 generated by the address generating unit 147 is in units of 1 pixel, and in FIG. 4, does not correspond to the grid cells which depict segments of 10 pixels. Since the simple address generating unit 142 calculates address regions in units of 10 pixels, the address region D1 generated by the simple address generating unit 142 corresponds to the grid cells depicted in FIG. 4. The second address region secondly generated by the address generating unit 147 is S2, and the second address region D2 generated by the simple address generating unit 142 is calculated so that the address region D2 includes the foregoing S2. Regarding relationships between D1 and D2, portions of the two regions D1 and D2 overlap each other.

When expressing a region with the bottom left coordinates and the top right coordinates, the region D1 is (w1,1) to (w5,3) and the region D2 is (w4,3) to (w8,5). Thus, the region D1 and the region D2 overlap each other in a region of (w4,3) to (w5,3). The determining unit 143 of the cache unit 141 omits reading the overlapping region of (w4,3) to (w5,3) which overlaps when reading the region D2, by using the management table 144. The operation of the determining unit 143 is described later. In the following description, for the grid depicted in FIG. 4, a portion in an X direction is also referred to as "column", and a portion in a Y direction is also referred to as "row". For example, a column next to w1 is w2.

High-Speed Storage Unit

Figure 5:
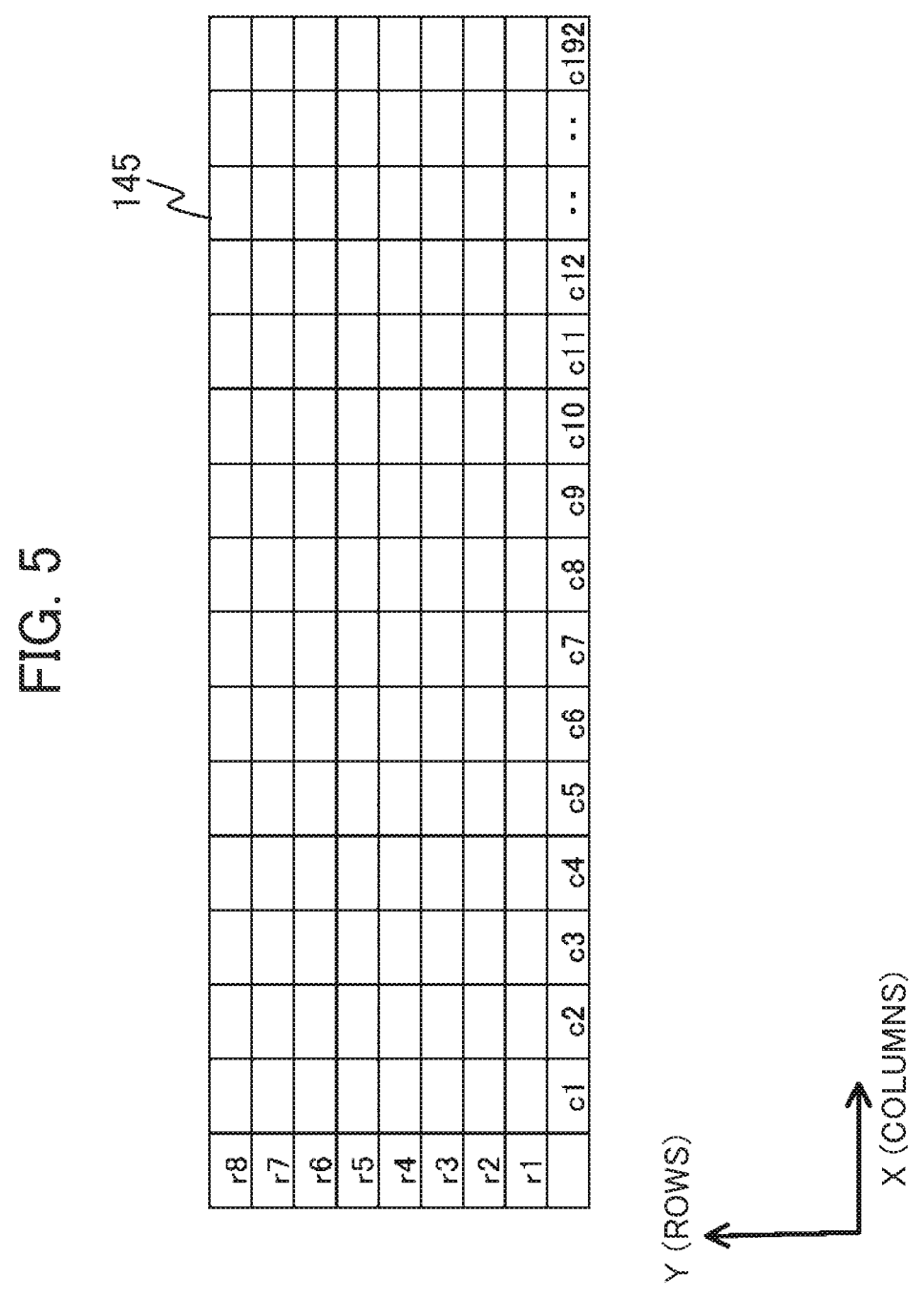

FIG. 5 is a schematic diagram depicting a structure of the high-speed storage unit 145. The high-speed storage unit 145 has a grid-like storage region with 192 regions in the X direction and 8 regions in the Y direction. The amount of information stored in each grid cell depicted in FIG. 5 is equal to the amount of information stored in each grid cell depicted in FIG. 4 and equal to the amount of information stored in 10 grid cells depicted in FIG. 3. Thus, all information of a captured image in the X direction or the horizontal direction is stored in the X direction of the high-speed storage unit 145 and information of 8 rows of the captured image in the Y direction is stored in the Y direction of the high-speed storage unit 145. Information is stored in each grid cell depicted in FIG. 5 in the order from the left of the figure to the right of the figure in ascending column number order, similarly to FIG. 3 and FIG. 4. Hereinafter, the number of rows in the Y direction of the high-speed storage unit 145 is also referred to as "predetermined storage row". In other words, in the present embodiment, the predetermined storage row is "8". To differentiate from the information, depicted in FIG. 4, of the captured image stored in the low-speed storage unit 13, the X direction of the high-speed storage unit 145 is referred to as "c1, c2, c3 . . . ", and the Y direction of the high-speed storage unit 145 is referred to as "r1, r2, r3 . . . " Hereinafter, each section of grid cells depicted in FIG. 5 in the X direction is also referred to as "column", and each section of grid cells in the Y direction is also referred to as "row". For example, the column next to c1 is c2.

Management Table

FIG. 6 is a diagram depicting an example of the management table 144. The management table 144 has storage regions that correspond to grid cells in the X direction of high-speed storage unit 145. The management table 144 stores maximum values among Y coordinates of the captured image that are input to the grid cells in the X direction of the high-speed storage unit 145. For example, the example shown in FIG. 6 indicates that information up to y=120 of the captured image is stored in c1. However, since the high-speed storage unit 145 can only store up to 8 rows of information as described above, y=113 to y=120 are stored in c1. As described above, since the distortion correcting unit 146 reads information of the captured image in the positive direction of the Y axis, the numeric value stored in the management table 144 increases as the process progresses.

Operation Example

An operation example of the image processing device 1 is described with reference to FIG. 7. FIG. 7(a) depicts regions that are included in the high-speed storage unit 145 and on which writing is executed first to fourth. FIG. 7(b) depicts regions that are included in the high-speed storage unit 145 and on which writing is executed thirty fourth to thirty seventh. FIG. 7(c) depicts values stored in the management table 144. A number indicated in each of grid cells depicted in FIGS. 7(a) and 7(b) indicates the number of times that writing is executed when image information is written to the grid cell. The regions enclosed by bold lines in FIG. 7 are regions corresponding to addresses generated by the simple address generating unit 142.

Since information of the captured image is not stored in the high-speed storage unit 145 before the start of the operation example depicted in FIG. 7, the maximum values among the Y coordinates are zero for all columns of c1 to c128, as indicated by an "initial" row in FIG. 7(c). The first writing by the cache unit 141 is executed on an entire region E1 depicted in FIG. 7(a). The cache unit 141 reads information of the region D1 depicted in FIG. 4 and writes the information to the region E1. In FIG. 7(a), "1" are indicated in the region that is included in the high-speed storage unit 145 and to which the information has been written. Since up to y=3 of the captured image is read into the columns c1 to c5 of the management table 144, "3" is recorded in each of fields c1 to c5 in the management table 144.

Next, the cache unit 141 reads the second region calculated by the simple address generating unit 142, or the region D2 depicted in FIG. 4. However, the region that is included in the region D2 and overlaps the region D1 or the region of (w4,3) to (w5,3) is not read. The cache unit 141 makes this determination by referring to the management table 144. In other words, when "3" is stored in the field c4 of the management table 144, the cache unit 141 does not read information of y=3 and less from the low-speed storage unit 13. The cache unit 141 writes the read information of pixels to a region E2 in the high-speed storage unit 145. When the writing to the region E2 is complete, up to y=5 of the captured image has been read into the columns c4 to c8 of the high-speed storage unit 145, and thus "5" is recorded in each of fields c4 to c8 of the management table 144.

Then, the cache unit 141 reads the captured image from the low-speed storage unit 13, executes writing to the high-speed storage unit 145, and executes writing to the management table 144 in a similar manner. However, since a storage region in the Y direction of the high-speed storage unit 145 is shorter compared to the captured image, a writing region becomes insufficient. In this case, the cache unit 141 determines the writing region as if r1 exists on top of r8. In other words, when a Y coordinate of a pixel of the captured image is Dy, a Y coordinate of the high-speed storage unit 145 to which the pixel is written is Ey, and the number of rows arranged in the Y direction of the high-speed storage unit 145 or the predetermined storage row is R, a relationship shown in Equation (1) is satisfied.

$$Ey = Dy \% R \qquad (1)$$

In other words, Ey is the remainder of dividing Dy by R. Since in the first embodiment R=8, and 9% 8=1, for example, information of pixels Y=9 of the captured image is stored in a row r1 of the high-speed storage unit 145. The cache unit 141 determines a writing destination region of the high-speed storage unit 145 based on this operation. When the cache unit 141 completes the process up to 4 times, information indicated in the second row is stored in the management table 144.

After that, when the reading of the captured image from the low-speed storage unit 13 and the writing to the high-speed storage unit 145 reach the right edges or w128 and c128, the simple address generating unit 142 shifts the region to be calculated in the positive direction of the Y axis. However, even in this case, the region partially overlaps a region previously read. For example, a region E34 depicted in FIG. 7(b) indicates a region corresponding to an address calculated on the 34th time of executing the process, which is immediately after the first time that the simple address generating unit 142 shifts the region to be calculated in the positive direction of the Y axis. In other words, according to the calculation by the simple address generating unit 142, E34 corresponds to the third to fifth rows of c1 to c5. However, the rows up to the third row in the columns c1 to c3 have been read in the first reading, and the rows up to the fifth row in the columns c4 to c5 have been read in the second reading. Thus, the cache unit 141 reads, from the low-speed storage unit 13, only pixel information of the fourth and fifth rows in w1 to w3 that have not yet been read, and writes the information to the high-speed storage unit 145. After that, the cache unit 141 similarly executes the process. After the cache unit 141 completes the process for the 37th time, information indicated in the third row is stored in the management table 144.

After the process further progresses, pixel information, read by the determining unit 143, of coordinates (w1,9) in the captured image is written to (c1, r1) in the high-speed storage unit 145. In other words, the information written in the first reading is overwritten. As mentioned above, since the distortion correcting unit 146 executes the raster scan, image information is not referred to by tracing Y coordinates. Due to this feature, the high-speed storage unit 145 can continuously overwrite information without storing previously written information in the high-speed storage unit 145.

Flowchart/Accumulation Process

Figure 8:
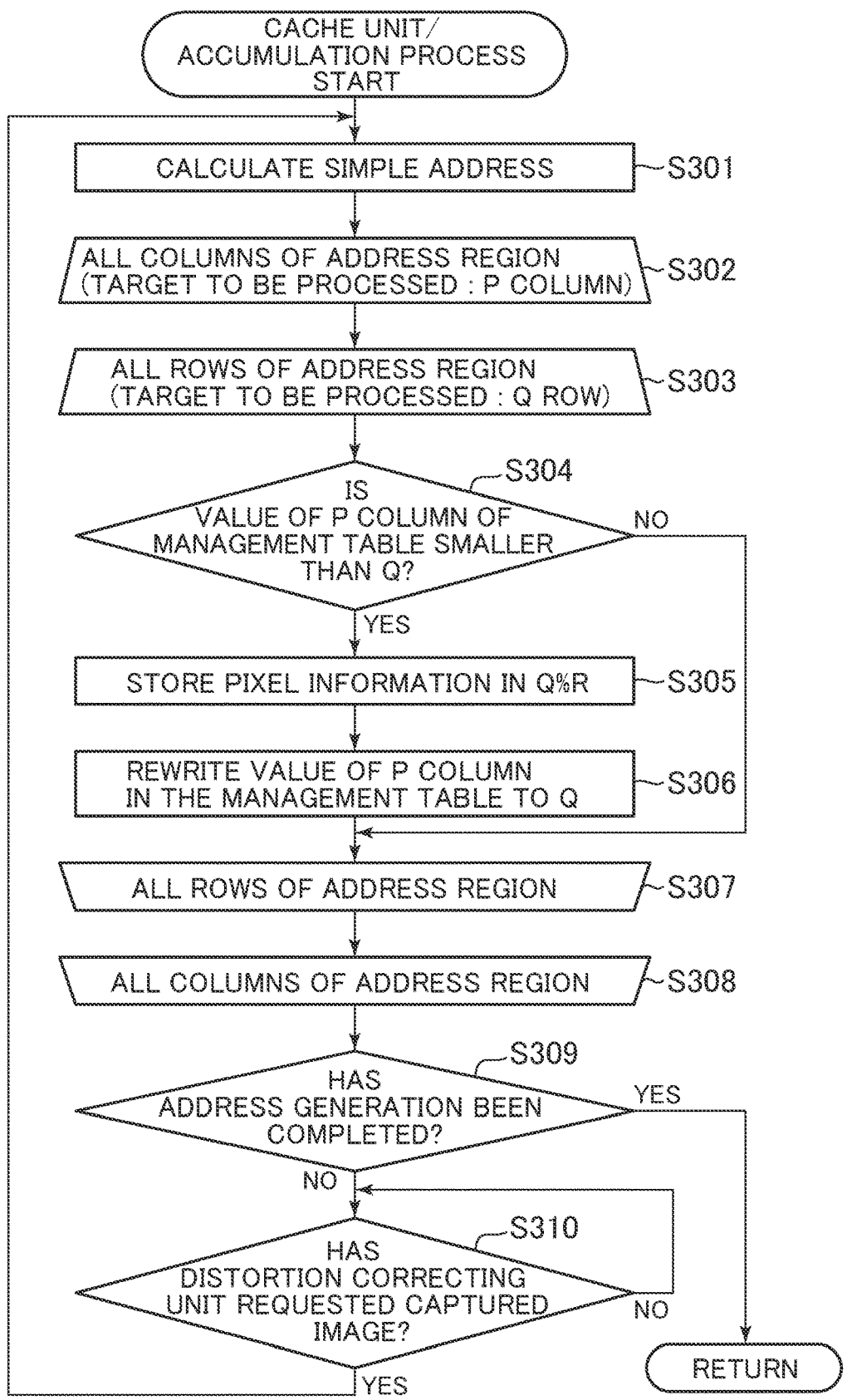
FIG. 8 is a flowchart of an accumulation process of a cache unit 141.

FIG. 8 is a flowchart depicting an operation in an accumulation process in which the cache unit 141 accumulates information of a captured image in the high-speed storage unit 145. The accumulation process is described using the flowchart depicting the operation of the cache unit 141, which enables the foregoing operation example. The cache unit 141 starts the operation prior to an operation of the distortion correcting unit 146.

In step S301, the simple address generating unit 142 of the cache unit 141 calculates an initial simple address. In subsequent step S302, the determining unit 143 sequentially sets, as a target to be processed, each of columns included in a region of the address calculated in step S301 and repeatedly executes a process from step S303 to step S307 sequentially on all the columns. Hereinafter, a column that is determined to be a target to be processed is referred to as a "P column". In subsequent step S303, the determining unit 143 sequentially sets, as a target to be processed, each of rows included in the region of the address calculated in step S301 and repeatedly executes a process from step S304 to step S306 sequentially on all the rows. Hereinafter, a row that is determined to be a target to be processed is referred to as a "Q row".

In subsequent step S304, the determining unit 143 reads a value stored in a field for the P column in the management table 144 and determines whether or not the value is smaller than Q. When the determining unit 143 determines that the value is smaller than Q, the process proceeds to step S305. When the determining unit 143 determines that the value is equal to or larger than Q, the process proceeds to step S307. In step S305, pixel information of the target to be processed is read from the low-speed storage unit 13 and stored in a (Q % R)-th row in the P column in the high-speed storage unit 145 or an Ey-th row according to Equation (1). In subsequent step S306, the value of the field for the P column in the management table 144 is rewritten to Q, and the process proceeds to step S307.

In step S307, the distortion correcting unit 146 determines whether or not all the rows that are included in the region of the address calculated in step S301 have been set as targets to be processed. When the distortion correcting unit 146 determines that a row that has not yet been set as a target to be processed exists, the distortion correcting unit 146 sets the row as a target to be processed, and the process returns to step S304. When the distortion correcting unit 146 determines that all the rows have been set as the targets to be processed, the process proceeds to step S308. In step S308, the distortion correcting unit 146 determines whether or not all the columns that are included in the region of the address calculated in step S301 have been set as targets to be processed. When the distortion correcting unit 146 determines that a column that has not yet been set as a target to be processed exists, the distortion correcting unit 146 sets the column as a target to be processed, and the process returns to step S303. When the distortion correcting unit 146 determines that all the columns have been set as the targets to be processed, the process proceeds to step S309.

In step S309, the cache unit 141 determines whether or not the address generation has been completed by the simple address generating unit 142. In other words, the cache unit 141 determines whether or not the process has been completely executed on the entire captured image. When the cache unit 141 determines that the address generation has been completely executed, the operation depicted in FIG. 8 is completed. When the cache unit 141 determines that the address generation has not been completely executed, the process proceeds to step S310. In step S310, the cache unit 141 determines whether or not the captured image has been requested by the distortion correcting unit 146. This is due to the fact that when the captured image is continuously read into the high-speed storage unit 145 without waiting for reading by the distortion correcting unit 146, a request for the captured image may be received from the distortion correcting unit 146 after information is overwritten with information of a captured image newly read. When the cache unit 141 determines that the distortion correcting unit 146 has requested image information, the process returns to step S301. When the cache unit 141 determines that the distortion correcting unit 146 has not yet requested the next image information, the process remains at step S310.

Flowchart/Read Process

FIG. 9 is a flowchart depicting a read processing operation in which the cache unit 141 reads information of the captured image from the high-speed storage unit 145 in accordance with a request from the distortion correcting unit 146. In step S321, the cache unit 141 receives, from the distortion correcting unit 146, a read command or the target address to be read from the captured image. It is assumed that the received address indicates coordinates (k, l) in the captured image. In subsequent step S322, the cache unit 141 identifies a column that is included in the high-speed storage unit 145 and includes a pixel whose X coordinate in the captured image is k. The column is identified by calculation using the number of pixels included in one column in the high-speed storage unit 145. In the embodiment, each column includes 10 pixels. For example, when k=45, it is identified that k is included in a row of a value obtained by rounding up 45/10 to the nearest integer, that is, included in the fifth row.

In subsequent step S323, the cache unit 141 identifies a row that is included in the high-speed storage unit 145 and includes coordinates where the Y coordinate in the captured image is l. The identification of the row can be achieved based on the foregoing Equation (1). However, since in the embodiment, the number of rows in the high-speed storage unit 145 is a power of two, the row can be easily calculated as follows. Specifically, values of Y coordinates in the captured image are expressed in binary form, and only digits that correspond to the number of rows in the high-speed storage unit 145 are evaluated in order from the last digit. More specifically, since in the embodiment, the number of rows in the high-speed storage unit 145 is 8, or two to the third power, a last 3-digit value is evaluated. For example, for the 21st row, since the decimal number "21" expressed in binary form is "10101", the last 3 digits are "101". When this is converted to a decimal form, $1 \times 2^2 + 0 \times 2^1 + 1 \times 2^0 = 5$, and thus the fifth row is identified.

In subsequent step S324, the cache unit 141 reads a pixel value in the high-speed storage unit 145 at the coordinates identified in steps S322 and S323. In subsequent step S325, the cache unit 141 outputs the pixel value read in step S324 to the distortion correcting unit 146.

According to the first embodiment, the following effects can be achieved.

(1) The image processing device 1 includes the low-speed storage unit 13 that stores a captured image extending in a column direction and a row direction, or an X direction and a Y direction, the high-speed storage unit 145 on which reading is executed at a higher speed than the low-speed storage unit 13 and which stores a region corresponding to the entire captured image in the column direction and a portion, corresponding to 8 rows, of the captured image in the row direction, the distortion correcting unit 146 that continuously reads the captured image from the high-speed storage unit 145 in the column direction, and the determining unit 143 that reads the captured image from the low-speed storage unit 13 and writes the captured image to the high-speed storage unit 145. The determining unit 143 determines a row number to be read next in the captured image based on the maximum row number in the row direction of the captured image stored in the high-speed storage unit 145 for each of targets that are to be processed and are obtained by dividing the column direction into predetermined pixels. Thus, the image processing device 1 easily determines whether a portion of the captured image has already been read or not, based on how large the row number is.

(2) The image processing device 1 also includes the management table that stores the minimum or maximum row number, stored in the high-speed storage unit 145, in the row direction for each of the targets to be processed. The determining unit 143 refers to the management table and determines whether or not to read the image from the low-speed storage unit 13 and write the image to the high-speed storage unit 145. To write the image to the high-speed storage unit 145, the determining unit 143 writes a row number of the image read from the low-speed storage unit 13 to the management table 144. Thus, the image processing device 1 can use the management table 144 to easily determine whether or not it is necessary to read the captured image.

(3) The determining unit 143 determines a position in the row direction in the high-speed storage unit 145 to which the image is to be written, based on the remainder of dividing the row number of the image by the predetermined storage row "8" of the high-speed storage unit 145. Thus, the determining unit 143 can easily determine a storage location in the high-speed storage unit 145. In addition, the cache unit 141 can easily determine a storage location through a similar process in reading from the high-speed storage unit 145 after reception of a request from the distortion correcting unit 146.

(4) The embodiment assumes that the predetermined storage row is "8", which is a power of two. When the row number of the captured image is expressed in binary form, the lower three bits indicate the row number stored in the high-speed storage unit 145. In other words, by setting the predetermined storage row to a power of two, the processing load of identifying the row number of a storage destination can be reduced.

(5) The determining unit 143 matches a position in the column direction in the high-speed storage unit 145 to which the image is to be written, with a position in the column direction on the captured image. Thus, the image processing device 1 can easily determine a writing position to write to the high-speed storage unit 145 and a reading position to read from the high-speed storage unit 145.

(6) Widths of the targets to be processed are units in which data is read from the low-speed storage unit 13 to the high-speed storage unit 145. Thus, the image processing device 1 can efficiently read the captured image from the low-speed storage unit 13.

First Modified Example

It is not a requirement that the number of pixels that can be stored in the high-speed storage unit 145 is in units in which data is read from the low-speed storage unit 13, and the number of pixels that can be stored in the high-speed storage unit 145 may be an integer multiple of the units in which data is read from the low-speed storage unit 13. Moreover, the number of pixels that can be stored in the high-speed storage unit 145 may be any other number of pixels. In addition, the foregoing X direction and Y direction, or column direction and row direction, can be interchanged.

Second Modified Example

Although in the foregoing embodiment, the resolution of the captured image is described as 1920×1080, the resolution of the captured image is not limited to this. When the resolution of the captured image is different from the embodiment, the size of the high-speed storage unit 145 in the X direction is changed based on this resolution. Specifically, the size in the X direction is set so that information of all pixels of the captured image in the X direction can be stored. The size in the Y direction is not affected by the resolution of the captured image.

Third Modified Example

In the foregoing embodiment, the width of the high-speed storage unit 145 in the Y direction, or the predetermined storage row, is a width corresponding to 8 pixels of the captured image. However, the predetermined storage row is not limited to "8". It is sufficient if the predetermined storage row has a width at least as large as the maximum width, in the Y direction, of the region of the address calculated by the simple address generating unit 142. However, to achieve the effects described in (4) above, it is desirable that the predetermined storage row be a minimum power of two that exceeds the maximum width, in the Y direction, of the region of the address calculated by the simple address generating unit 142. Specifically, when the maximum width, in the Y direction, of the region of the address calculated by the simple address generating unit 142 is 17, $2^4 < 17 < 2^5$, and thus it is desirable to set the predetermined storage row to $2^5$ or 32.

Regarding the region of the address calculated by the simple address generating unit 142, since the region of the calculated address is based on distortion correction, distortion is generally greater in the periphery that is offset from the center, and the region of the calculated address is larger. In addition, since distortion of a lens can be estimated from processing precision of the lens and design values, it is possible to determine the size of the high-speed storage unit 145 in advance.

Fourth Modified Example

In the foregoing embodiment, the value of a Y coordinate is calculated in reading of information of the captured image from the high-speed storage unit 145 in accordance with a request from the distortion correcting unit 146. However, in storing of the information of the captured image to the high-speed storage unit 145, a correspondence table of a Y coordinate value in a captured image and a Y coordinate value in the high-speed storage unit 145 may be generated, and the correspondence table may be referred to in the reading of the information of the captured image from the high-speed storage unit 145.

Fifth Modified Example

In the foregoing embodiment, as explained in step S310 of FIG. 8, the cache unit 141 reads the captured image from the low-speed storage unit 13 on condition that the distortion correcting unit 146 requests information of the captured image. However, the cache unit 141 may read the captured image from the low-speed storage unit 13 each time a certain period of time elapses, without waiting for a request from the distortion correcting unit 146. In this case, in step S310 of FIG. 8, the cache unit 141 determines whether or not the predetermined time period has elapsed after the previous reading from the low-speed storage unit 13.

Sixth Modified Example

The configuration of the high-speed storage unit 145 depicted in FIG. 5 is a concept, and a memory region that is physically laid out in two dimensions may not be allocated. For example, a two-dimensional array or a combination of one-dimensional arrays in a programming language may be used to achieve the configuration of the high-speed storage unit 145 depicted in FIG. 5.

Seventh Modified Example

In the foregoing embodiment, the low-speed storage unit 13 is a SD-RAM, and the high-speed storage unit 145 is a storage region allocated to the FPGA. However, the low-speed storage unit 13 may be a storage region with a lower speed, such as an SSD (Solid State Drive), a flash memory, or a hard disk drive, and the high-speed storage unit 145 may be a SD-RAM. In other words, it is acceptable if at least the reading speed of the high-speed storage unit 145 is faster than the low-speed storage unit 13. When the high-speed storage unit 145 is not a storage region allocated to the FPGA, at least one of the simple address generating unit 142, the determining unit 143, and the distortion correcting unit 146 may be achieved by causing a CPU to execute a program.

Moreover, an input/output interface that is included in the image processing device 1 and is not depicted may be used to read this program from another device via a medium that can be used when necessary. The medium is, for example, a removable storage medium attachable to and detachable from the input/output interface, or a communication medium, or a network such as a wired network, a wireless network, or an optical network, or a carrier wave or digital signal that propagates via the foregoing network. In addition, some or all of the functions achieved by the program may be achieved by a hardware circuit or a FPGA.

The foregoing modified examples may be combined. Although the embodiment and the modified examples are described above, the invention is not limited to the foregoing contents. Other aspects that can be envisioned within the scope of the technical concept of the invention are included in the scope of the invention.

The contents disclosed in the following priority application are herein incorporated by reference.

Japanese Patent Application No. 2017-125597 (filed on Jun. 27, 2017)

LIST OF REFERENCE SIGNS

1: IMAGE PROCESSING DEVICE
11: IMAGE INPUT UNIT
12: PRE-PROCESSING UNIT
13: LOW-SPEED STORAGE UNIT
14: POST-PROCESSING UNIT
15: IMAGE OUTPUT UNIT
141: CACHE UNIT

142: SIMPLE ADDRESS GENERATING UNIT
143: DETERMINING UNIT
144: MANAGEMENT TABLE
145: HIGH-SPEED STORAGE UNIT
146: DISTORTION CORRECTING UNIT
147: ADDRESS GENERATING UNIT
148: CORRECTING UNIT

The invention claimed is:

1. A processing device comprising:
a low-speed storage unit in which an image extending in a column direction and a row direction is stored;
a high-speed storage unit on which reading is executed at a higher speed than the low-speed storage unit and which stores a region corresponding to the entire image in the column direction and a predetermined storage row that is a portion in the row direction of the image;
a reading unit that continuously reads the image in the column direction from the high-speed storage unit;
a determining unit that reads the image from the low-speed storage unit and writes the image to the high-speed storage unit,
wherein the determining unit determines a row number to be read next in the image based on a minimum or maximum row number, in the row direction of the image stored in the high-speed storage unit, for each of targets that are to be processed and are obtained by dividing the column direction into predetermined pixels.

2. The processing device according to claim 1, further comprising:
a management table that stores the minimum or maximum row number, stored in the high-speed storage unit, in the row direction for each of the targets to be processed,
wherein the determining unit refers to the management table and determines whether or not to read the image from the low-speed storage unit and write the image to the high-speed storage unit, and
wherein in the writing of the image to the high-speed storage unit, the determining unit writes, to the management table, the row number of the image read from the low-speed storage unit.

3. The processing device according to claim 1,
wherein the determining unit determines a position in the row direction in the high-speed storage unit to which the image is to be written, based on the remainder of dividing the row number of the image by the predetermined storage row of the high-speed storage unit.

4. The processing device according to claim 3,
wherein the predetermined storage row is a power of two.

5. The processing device according to claim 1,
wherein the determining unit matches a position in the column direction in the high-speed storage unit to which the image is to be written, with a position in the column direction on the image.

6. The processing device according to claim 1,
wherein widths of the targets to be processed are units in which the image is read from the low-speed storage unit.

* * * * *